United States Patent [19]
Asik

[11] Patent Number: 5,983,627
[45] Date of Patent: Nov. 16, 1999

[54] CLOSED LOOP CONTROL FOR DESULFATING A $NO_x$ TRAP

[75] Inventor: Joseph Richard Asik, Bloomfield Hills, Mich.

[73] Assignee: Ford Global Technologies, Inc., Dearborn, Mich.

[21] Appl. No.: 08/922,104

[22] Filed: Sep. 2, 1997

[51] Int. Cl.⁶ .................................................. F01N 3/00
[52] U.S. Cl. .............................. 60/274; 60/276; 60/285; 60/295
[58] Field of Search .............................. 60/274, 276, 285, 60/295, 301

[56] References Cited

U.S. PATENT DOCUMENTS

| 3,696,618 | 10/1972 | Boyd et al. . |
| 4,033,122 | 7/1977 | Masaki et al. . |
| 4,036,014 | 7/1977 | Ariga . |
| 5,402,641 | 4/1995 | Katoh et al. ................................ 60/297 |
| 5,473,890 | 12/1995 | Takeshima et al. . |
| 5,655,363 | 8/1997 | Ito et al. .................................... 60/276 |
| 5,724,808 | 3/1998 | Ito et al. .................................... 60/285 |
| 5,740,669 | 4/1998 | Kinugasa et al. ......................... 60/285 |
| 5,743,083 | 4/1998 | Hepburn . |

FOREIGN PATENT DOCUMENTS

| 0 580 389 A1 | 1/1994 | European Pat. Off. . |
| 1 597 752 | 9/1981 | United Kingdom . |
| 2 270 777 | 3/1994 | United Kingdom . |
| 2 307 313 | 5/1997 | United Kingdom . |

Primary Examiner—Thomas E. Denion
Attorney, Agent, or Firm—Allan J. Lippa; Roger L. May

[57] ABSTRACT

A system and method for desulfating an $NO_x$ trap utilizes a closed loop control of the air-to-fuel (A/F) ratio to accurately maintain a precise A/F ratio during desulfation. An oxygen sensor is positioned in the middle of the trap to provide an actual A/F ratio measurement, which is subsequently compared to a target A/F ratio to generate a correction signal to adjust operation of the engine's fuel injector(s). The trap oxygen sensor can also be used to adaptively update engine state conditions for a more precise switch-over to a trap regeneration phase.

15 Claims, 3 Drawing Sheets

CLOSED LOOP CONTROL FOR DESULFATING A $NO_x$ TRAP

Technical Field

This invention relates to exhaust after-treatment and, more particularly, to a method and apparatus for controlling an air/fuel ratio during removal of accumulated sulfur in an $NO_x$ trap.

BACKGROUND ART

Generally, lean burn engines typically operate with an air/fuel (A/F) ratio $\geq 18$ to obtain improved fuel economy. However, a conventional three-way catalyst (TWC) utilized in the engine exhaust system is ineffective unless operated near a stoichiometric ratio, such as an A/F ratio of 14.5 for gasoline. One solution for overcoming the operational deficiencies of a TWC during lean burn operation is to position a $NO_x$ trap downstream of the TWC. The $NO_x$ trap stores $NO_x$ during lean A/F operation, which can then be subsequently converted to harmless $N_2$ and $O_2$ by periodically operating the engine with a rich A/F ratio. This $NO_x$ conversion occurs within an optimum temperature window of approximately 300° C. to 400° C. An $NO_x$ trap is preferably located underbody so that during hard, wide-open throttle (WOT) driving, the trap temperature can be maintained below 800° C.

One problem inherent to an $NO_x$ trap stems from the fact that the use of a fuel which contains sulfur will cause a corresponding accumulation of sulfur in the trap. This accumulation of sulfur decreases the $NO_x$ conversion efficiency. Thus, the sulfur must be periodically "burned" off or desorbed by heating the trap to approximately 675° C. and sustaining that temperature for several minutes. During this desulfation heating phase, it is desirable to control the average A/F ratio reaching the trap to be approximately stoichiometric so as to minimize emission of HC, CO, and $NO_x$, and to prevent thermal damage to the trap. Stoichiometric operation may be required for periods of 3 to 8 minutes.

One way of controlling the A/F ratio is with an open loop type control system. However, if the A/F ratio is not accurately maintained during the desulfation phase, performance of the trap desulfation process will be significantly compromised by allowing higher levels of HC, CO, and $NO_x$ to be emitted from the exhaust system if the A/F operation is excessively rich, and possible $NO_x$ trap degradation at high temperatures if the A/F operation is excessively lean. This, in turn, degrades the overall efficiency of the engine exhaust treatment system. Since accuracy of an open loop-type control system can be directly impacted by such factors as engine-to-engine variability, and component/engine aging, use of an open loop control arrangement is not completely satisfactory, particularly when higher levels of exhaust treatment efficiency are required for lean burn engines.

DISCLOSURE OF THE INVENTION

Therefore, it is an object of the present invention to provide an improved A/F ratio control system and method for desulfation of a lean $NO_x$ trap which remains accurate irrespective of system or engine variability or aging, and which minimizes the possibility of thermal damage to the trap.

In accordance with a first aspect of the present invention, a system for controlling an A/F ratio during desulfation of an $NO_x$ trap used in an exhaust system of an engine comprises an oxygen sensor connected to the engine exhaust system and arranged to provide an output signal representative of the concentration of oxygen present in the exhaust flowing through the trap. A fuel injection subsystem is connected to the engine. A processor responsive to the oxygen sensor output signal is provided for generating a signal representative of an actual A/F ratio of the exhaust in the trap. An error signal generator is responsive to the actual A/F ratio signal and a target A/F ratio for generating an A/F ratio error signal. A controller is connected to the fuel injection subsystem and is responsive to the error signal for adjusting the fuel quantity supplied to the engine.

In accordance with a second aspect of the present invention, a method for controlling an air-to-fuel ratio during a desulfation phase of an $NO_x$ trap used to reduce emission of $NO_x$ in an exhaust system of an engine includes the steps of measuring the oxygen concentration present in the exhaust flowing through the trap, and determining an actual A/F ratio based on the measured oxygen concentration. The actual A/F ratio is subsequently compared to a target A/F ratio, and an A/F ratio error signal is generated based on the comparison between the actual and target A/F ratios. The fuel quantity supplied to the engine is accordingly adjusted based on the A/F ratio error signal.

In a preferred embodiment, the first oxygen sensor is positioned at a midbrick location in the $NO_x$ trap to provide an accurate measurement of the oxygen concentration. In addition, the actual A/F ratio can be adaptively used to update at least one engine state condition utilized during a stoichiometric phase of an engine lean burn operation.

Thus, because the present invention provides continual monitoring and adjustment of the A/F ratio during the desulfation heating phase, the present invention assures accurate A/F control. Accordingly, improvement is attained in the efficiency of desulfation process and the overall operation of the lean burn exhaust treatment system while also minimizing the impact of component aging and variability in engine performance. In addition, the present invention allows precise control of the A/F ratio so as to implement a strategy which minimizes $NO_x$ damage due to excessive lean A/F when the trap is hot, while also maximizing sulfur burn-off with a rich A/F when the trap is at a peak burn-off temperature, i.e., 675° C.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
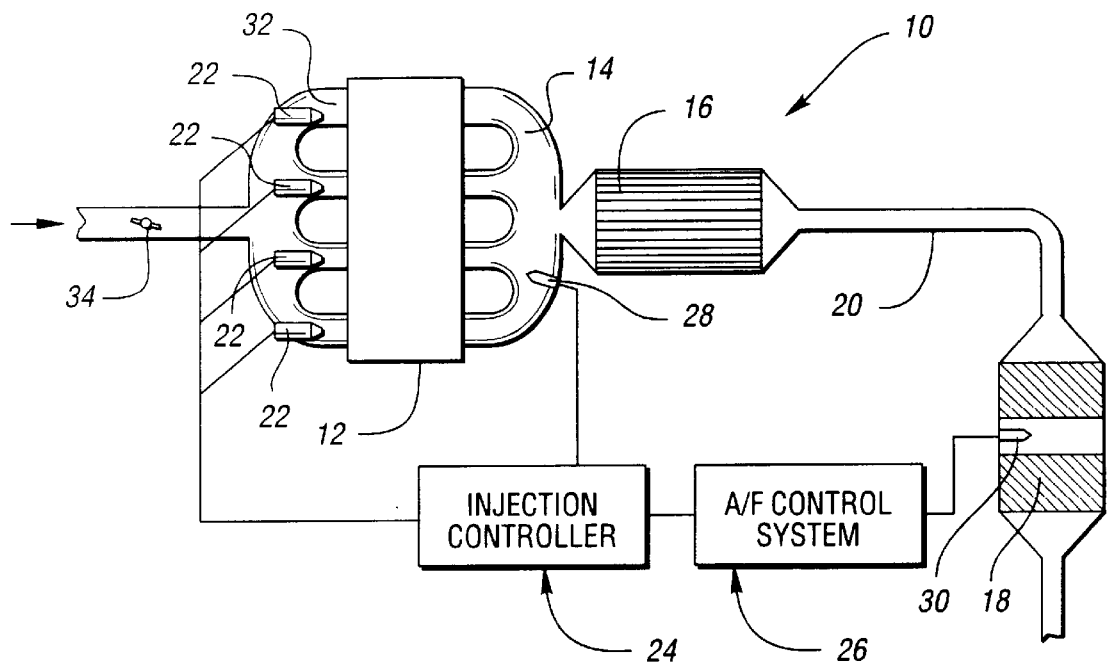
FIG. 1 shows a lean burn exhaust system in accordance with a first embodiment of the present invention.

Referring to FIG. 1, a first embodiment of a lean burn engine exhaust system 10 in accordance with the present invention includes an engine 12 having a conventional exhaust manifold 14 coupled thereto, a close coupled monolithic three-way catalytic (TWC) converter 16 in fluid communication with the exhaust manifold 14, and an underbody $NO_x$ trap 18 connected to the TWC converter 16 via approximately 1 meter of exhaust pipe 20. At least one fuel injector 22 delivers fuel to the engine 12 during operation thereof. While four such injectors are shown, this is not to be construed as limiting. A fuel injection controller 24 controls operation of the fuel injector(s) 22 in accordance with any conventional fuel control algorithm strategy such as proportional integral (PI) with jump and ramp, proportional integral differential (PID), or equivalent thereof.

A first oxygen sensor 28 is coupled to the exhaust manifold 14 and the fuel injection control system 24 for controlling the A/F ratio of the engine exhaust during normal operation of engine 12, such as during the stoichiometric phase of the lean burn operation. As discussed in more detail below, a closed loop A/F ratio control system 26 is responsive to a second oxygen sensor 30 coupled to $NO_x$ trap 18 for controlling the A/F ratio during the heating phase of the trap desulfation process. Sensor 30 is preferably positioned in the middle of the trap 18, i.e., a "midbrick" location, so as to provide accurate measurement by assuring that the exhaust has mixed well and has reached catalytic equilibrium prior to reaching sensor 30. Sensors 28 and 30 can be implemented in any suitable form, such as a heated exhaust gas oxygen (HEGO) type sensor, an exhaust gas oxygen (EGO) type sensor, or a linear type sensor such as a universal exhaust gas oxygen (UEGO) sensor.

Figure 2:
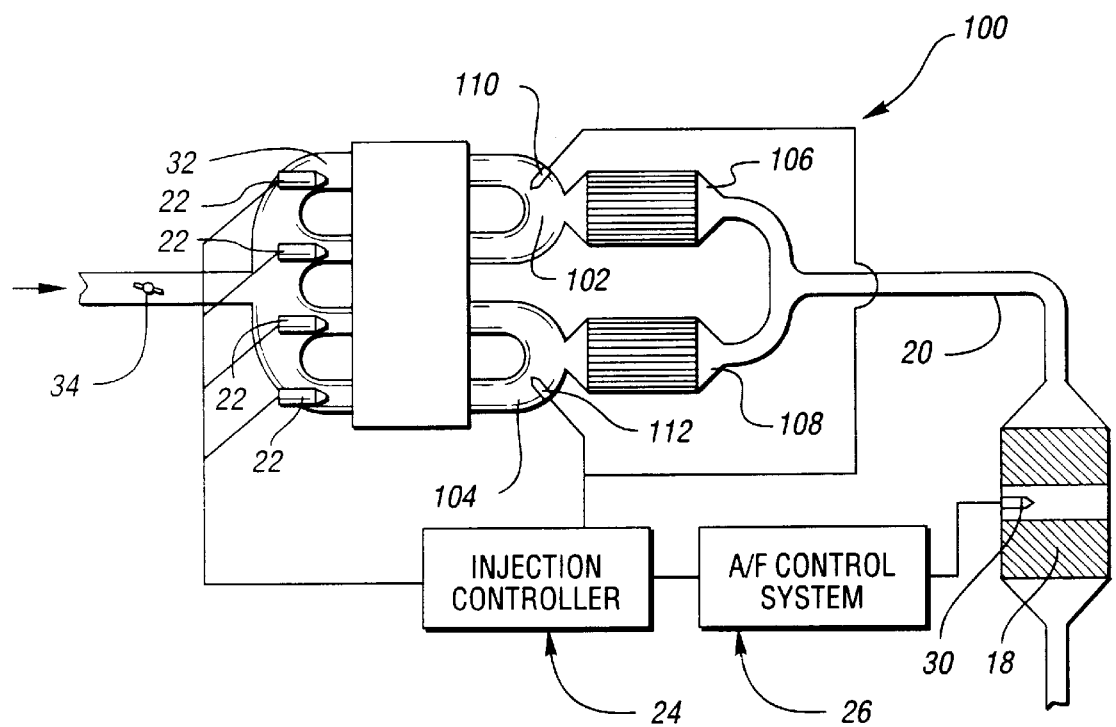
FIG. 2 shows a lean burn exhaust system in accordance with a second embodiment of the present invention.

FIG. 2 shows an alternative lean burn engine exhaust system 100 in accordance with the present invention where like elements to those shown and described in context with system 10 of FIG. 1 are denoted with the same reference numbers. System 100 utilizes a split exhaust design having two separate exhaust manifolds 102 and 104 respectively coupled to an associated TWC converter 106 and 108. Individual exhaust manifold oxygen sensors 110 and 112 are provided for non-lean burn operation. In both systems 10 and 100, air is input through an intake manifold 32 under control of a throttle 34.

Heating of $NO_x$ trap 18 can be achieved using one of several different methods, such as disclosed in commonly owned U.S. patent application Ser. No. 08/764,185, filed on Dec. 13, 1996, incorporated by reference herein. More specifically, for system 10 of FIG. 1, one suitable method for heating can create a sufficient temperature rise in $NO_x$ trap 18 by modulation of the air/fuel mixture supplied to the engine cylinders through dynamic control of the fuel provided by fuel injector(s) 22. For example, the engine cylinders can be dynamically switched between lean and rich operation per a predetermined number of engine cycles or time frames.

Alternatively, the engine cylinders can be divided into two groups, wherein one of the groups is operated at a lean A/F ratio while the other group is operated at a rich A/F ratio. The catalytic activity of the $NO_x$ trap promotes an exothermic reaction resulting in both catalyzed combustion and the generation of heat. This, in turn, causes the temperature of the $NO_x$ trap to increase to approximately 675° C., thereby permitting burning-off of the accumulated sulfur in the trap.

With respect to system 100 shown in FIG. 2, the selected type of injector A/F ratio control arrangement is utilized to produce separate rich and lean exhaust streams which physically combine in exhaust pipe 20. As noted above, the corresponding catalytic combustion which occurs in the trap 18 causes the temperature of the trap to rise to the desired desulfation temperature range. In both the single exhaust and split exhaust embodiments, the trap 18 has a normal operational temperature range of 300° to 400° C. to provide sufficient $NO_x$ conversion efficiency, and a desulfation temperature range of 650° to 675° C., with a maximum temperature of 800° C.

Figure 3:
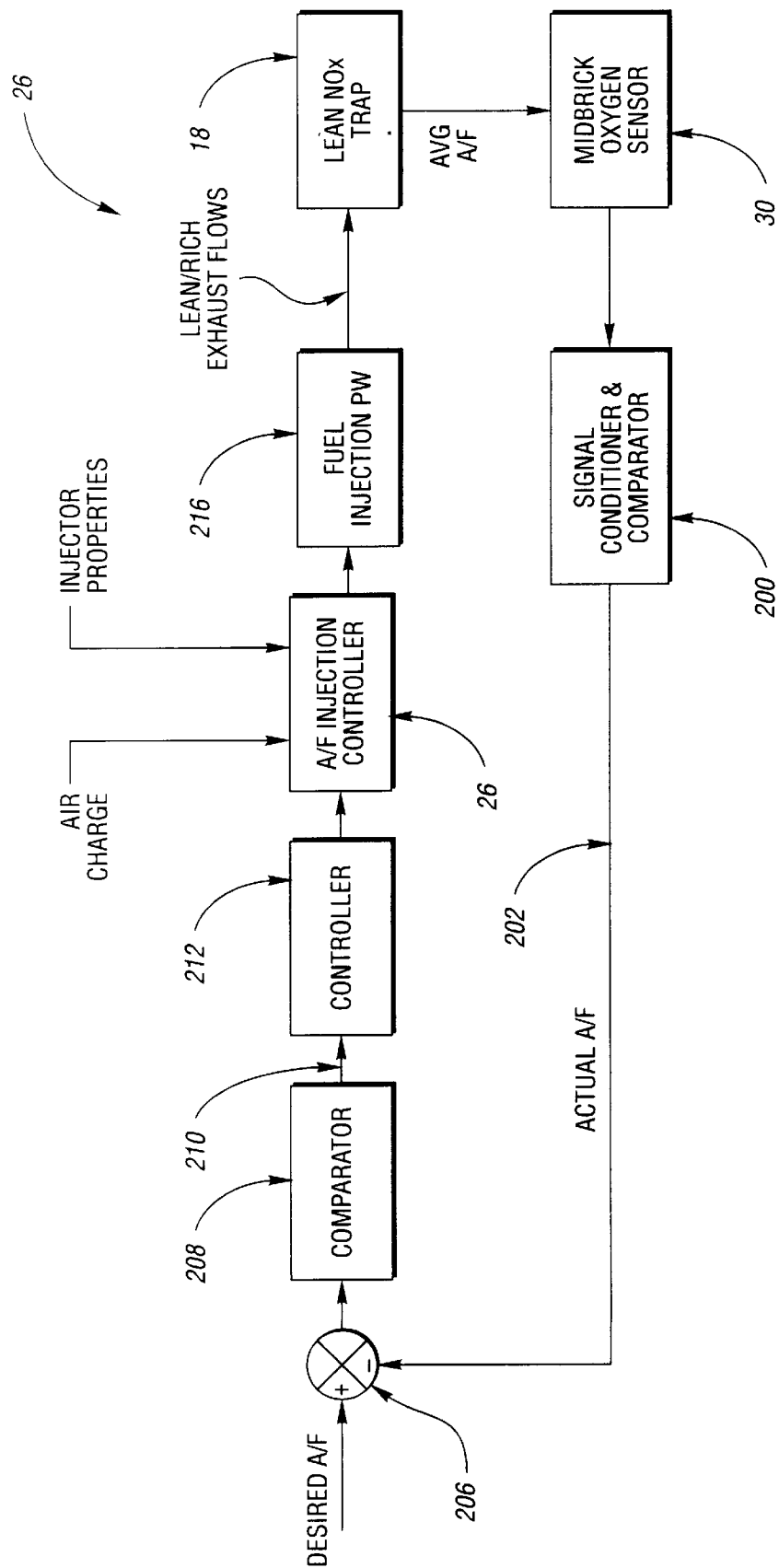
FIG. 3 is a block diagram of a closed loop A/F ratio control system in accordance with the present invention.

Referring to FIG. 3, a block diagram illustrates the closed loop A/F ratio control system 26 in accordance with the present invention. The output of trap oxygen sensor 30 is fed to a signal conditioner and comparator circuit 200 to generate an actual A/F ratio signal 202. The actual A/F ratio signal 202 is processed along with a desired or target A/F ratio 204, such as 14.5, at combiner 206. A comparator 208 produces an A/F ratio error signal 210. An A/F ratio controller 212 generates a correction signal 214 based on error signal 210, which is supplied to fuel injector controller 24. A fuel pulsewidth (PW) 216 is determined based on the A/F ratio correction signal 214 and other factors such as engine air charge and properties of the fuel injector(s). The fuel PW 216 is used to control operation of the fuel injectors so as to produce a lean/rich exhaust flow to the $NO_x$ trap 18 in accordance with a strategy which as noted above minimizes possible thermal damage to the trap, while maximizing sulfur burn-off when the trap is a the peak burn-off temperature, e.g., maintaining the A/F ratio slightly rich during the heat up phase, some what richer during the sulfur burn-off phase, and slightly rich during the cool down phase. Thus, system 26 utilizes constant feedback control to accurately control the A/F ratio during the desulfation heating phase for trap 18.

In addition, after the $NO_x$ trap has been heated at the appropriate temperature for a predetermined period of time, e.g. 3–5 minutes, closed loop A/F ratio control is terminated, and an open or closed loop control arrangement starts a regeneration phase to restore or rejuvenate the operating efficiency of the $NO_x$ trap to near original capability. More specifically, during the regeneration phase, the A/F ratio is controlled to be richer than stoichiometric, for example $0.97 \times A/F_{stoich}$–14.1, for a predetermined period of several minutes. After this predetermined period, the system returns to the normal lean burn operation. Open loop control is employed when either a UEGO sensor is not used, or when a HEGO sensor is insensitive. Otherwise, closed loop A/F control is employed.

In further accordance with the present invention, the actual A/F ratio as measured by trap oxygen sensor 30 can be adaptively used during the desulfation phase to update at least one engine state condition required for stoichiometric A/F ratio operation. Thus, the updated state conditions allow a more precise jump to open loop control during the regeneration phase.

Figure 4:
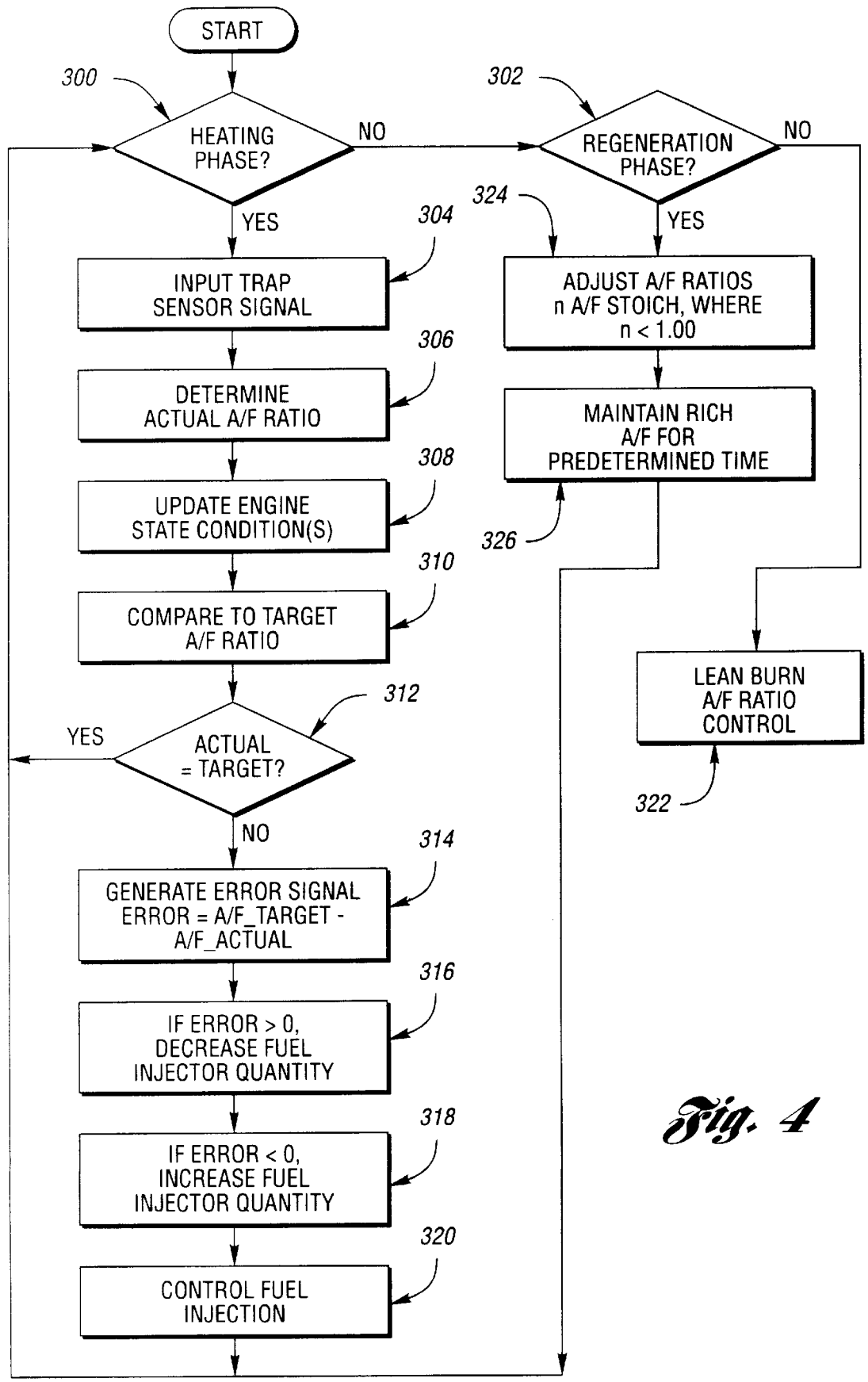
FIG. 4 is a flow chart showing the overall operation of the A/F ratio control system of the present invention.

Overall operation of the present invention is summarized in the flow chart of FIG. 4. Initially, as shown at block 300, A/F ratio control system 26 determines whether the system is currently in the $NO_x$ trap desulfation heating phase. If the system is not currently in the desulfation heating phase, the system determines whether the trap regeneration phase has started at block 302. If the desulfation heating phase has been initiated, the output of oxygen sensor 30 is received at block 304, and processed at block 306 to determine the actual A/F ratio. The engine state conditions can be updated as shown at block 308.

At block 310, the actual A/F ratio is compared to the desired A/F ratio, and as shown at block 312, if the actual A/F ratio is equal to the desired A/F ratio, the process returns to block 300. If the ratios are not equal, an error signal is generated at block 314 in accordance with error=A/F__ target—A/F_actual. If the error is positive, the injected fuel quantity is decreased as shown in block 316. If the error is negative, the injected fuel quantity is increased as shown at block 318. The corrected fuel injection quantity is then used to control operation of the fuel injector(s) as shown at block 320. The process then returns to block 300.

In addition, as noted above, if the system is not currently in the desulfation heating phase, and the system has determined at block 302 that the trap regeneration has not begun, then A/F control reverts to the normal lean burn engine operation control arrangement as shown at block 322. If the regeneration phase has begun, then at block 324, the A/F ratio is made rich by adjusting the ratio in accordance with $n * A/F_{stoich}$, where n<1.00. This rich A/F ratio is maintained for a predetermined period of time as shown at block 326. The process then returns to block 300.

While the best mode for carrying out the invention has been described in detail, those familiar with the art to which this invention relates will recognize various alternative designs and embodiments for practicing the invention as defined by the following claims.

What is claimed is:

1. A system for controlling an air-to-fuel ratio during a desulfation phase of an $NO_x$ trap used to reduce emission of $NO_x$ in an exhaust system of an engine, the desulfation phase comprising a trap heating phase in which the air-to-fuel ratio is used to raise the temperature within the trap to a desired desulfation temperature range, and a trap regeneration phase following the heating phase, said system comprising:

a first oxygen sensor connected to the engine exhaust system and arranged to provide an output signal representative of the oxygen concentration present in the exhaust gases flowing through the trap;

a fuel injection subsystem connected to the engine;

a processor arranged to generate during the trap heating phase a signal responsive to said oxygen sensor output signal that is representative of an actual air-to-fuel ratio of the exhaust in the trap;

an error signal generator responsive to said actual air-to-fuel signal and a target air-to-fuel ratio for generating an air-to-fuel ratio error signal; and a controller connected to said fuel injection subsystem for controlling the air-to-fuel ratio of the exhaust gases, wherein the controller is responsive to said error signal for adjusting the fuel concentration supplied to the engine during the trap heating phase, and is further responsive to the regeneration phase to reset the ratio to a predetermined ratio for a predetermined period of time.

2. The system of claim 1 wherein said first oxygen sensor is mounted to the $NO_x$ trap so as to positioned at a midbrick location.

3. The system of claim 1 further comprising at least a second oxygen sensor connected to an exhaust manifold in the engine exhaust system, said at least second oxygen sensor arranged to provide an output signal for use during a stoichiometric phase of an engine lean burn operation.

4. The system of claim 3 wherein said exhaust manifold comprises two separate manifolds coupled to the engine, and said at least a second oxygen sensor comprises an oxygen sensor mounted to each exhaust manifold.

5. The system of claim 1 wherein said processor is further operative to update at least one engine state condition utilized during normal operation of the engine based on the actual A/F ratio.

6. The system of claim 1 wherein said target A/F ratio is a stoichiometric ratio.

7. The system of claim 1 wherein said controller is operative to reset the air-to-fuel ratio to be richer than stoichiometric for the predetermined period of time.

8. A method for controlling an air-to-fuel ratio during a desulfation phase of an $NO_x$ trap used to reduce emission of $NO_x$ in an exhaust system of an engine, said method comprising the steps of:

initiating a trap heating phase;

measuring the oxygen concentration present in the exhaust flowing through the trap during the trap heating phase;

determining an actual air-to-fuel ratio based on the measured oxygen concentration;

comparing the actual air-to-fuel ratio to a target air-to-fuel ratio;

generating an air-to-fuel ratio error signal based on the comparison between the actual and target air-to-fuel ratios;

adjusting the fuel concentration supplied to the engine based on the air-to-fuel ratio error signal; and after completion of the trap heating phase, switching to an open loop air-to-fuel ratio control during a trap regeneration phase.

9. The method of claim 8 wherein the step of measuring the oxygen concentration present in exhaust flowing through the trap comprises positioning a first oxygen sensor in the engine exhaust system so as to provide an output representative of the oxygen concentration.

10. The method of claim 9 further comprising the step of positioning the first oxygen sensor at a midbrick location of the $NO_x$ trap.

11. The method of claim 9 further comprising the step of positioning at least a second oxygen sensor in an exhaust manifold in the engine exhaust system to provide an output signal for use during a stoichiometric phase of an engine lean burn operation.

12. The method of claim 11 wherein said exhaust manifold comprises two separate manifolds coupled to the engine, and said step of positioning at least a second oxygen sensor comprises positioning an oxygen sensor in each exhaust manifold.

13. The method of claim 8 further comprising the step of updating at least one engine state condition utilized during normal operation of the engine based on the actual A/F ratio based on said actual A/F ratio.

14. The method of claim 8 wherein said target air-to-fuel ratio is a stoichiometric ratio.

15. The method of claim 8 wherein open loop control is provided by adjusting the fuel concentration supplied to the engine to be richer than stoichiometric for a predetermined period of time.

* * * * *